United States Patent
Rivola et al.

(10) Patent No.: US 11,247,796 B2
(45) Date of Patent: Feb. 15, 2022

(54) MACHINE FOR FORMING FILTER BAGS FOR INFUSION PRODUCTS

(71) Applicant: I.M.A. Industria Macchine Automatiche S.p.A., Ozzano Dell'Emilia (IT)

(72) Inventors: Sauro Rivola, Ozzano Dell'Emilia (IT); Manuel Buscaroli, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 51 days.

(21) Appl. No.: 16/753,097

(22) PCT Filed: Oct. 24, 2018

(86) PCT No.: PCT/IB2018/058285
§ 371 (c)(1),
(2) Date: Apr. 2, 2020

(87) PCT Pub. No.: WO2019/087012
PCT Pub. Date: May 9, 2019

(65) Prior Publication Data
US 2020/0317379 A1    Oct. 8, 2020

(30) Foreign Application Priority Data

Oct. 31, 2017    (IT) .......... 102017000123953

(51) Int. Cl.
*B65B 29/02*    (2006.01)
*B65B 57/14*    (2006.01)
(Continued)

(52) U.S. Cl.
CPC ............ *B65B 29/028* (2017.08); *B65B 43/50* (2013.01); *B65B 43/60* (2013.01); *B65B 57/14* (2013.01); *B65G 47/847* (2013.01)

(58) Field of Classification Search
CPC ....... B65B 29/02; B65B 29/028; B65B 29/04; B65B 43/50; B65B 43/60; B65B 57/14; B65G 47/847
(Continued)

(56) References Cited

U.S. PATENT DOCUMENTS 2,881,574 A * 4/1959 Wardell ................ B65B 29/028
  53/456
3,969,873 A * 7/1976 Klar ........................ B65B 29/04
  53/134.2

(Continued)

FOREIGN PATENT DOCUMENTS

CN    1483645 A    3/2004
CN    101454207 A    6/2009
(Continued)

OTHER PUBLICATIONS

Chinese Office Action dated Mar. 22, 2021 from counterpart Chinese Patent Application No. 201880070729.2.
European Office Action dated Jun. 9, 2021 from counterpart European Patent Application No. 18800769.4.
International Search Report and Written Opinion dated Dec. 17, 2018 for counterpart International Application No. PCT/IB2018/058285.

*Primary Examiner* — Stephen F. Gerrity
(74) *Attorney, Agent, or Firm* — Shuttleworth & Ingersoll, PLC; Timothy Klima

(57) ABSTRACT

A machine for forming filter bags for infusion products includes a carousel and a transfer wheel with a plurality of gripping devices. A plurality of control devices control the gripping devices between a first operating position for receiving a filter bag from the carousel or for releasing the filter bag in a collection zone, and a second operating position for retaining the filter bag. A control unit measures (Continued)

defects in the filter bags. An auxiliary control device is located on the transfer wheel and connected to the control unit for controlling, selectively, the passage from a second operating retaining position to a first release position on a predetermined gripping device and along an angular stretch of rotation of the transfer wheel, at a control signal of the control unit generated in the presence of a defective filter bag, to release the defective filter bag in a different collecting zone.

14 Claims, 10 Drawing Sheets

(51) Int. Cl.
  *B65B 43/50* (2006.01)
  *B65B 43/60* (2006.01)
  *B65G 47/86* (2006.01)

(58) Field of Classification Search
  USPC .................. 53/413, 134.1, 134.2, 53, 54
  See application file for complete search history.

(56) References Cited

U.S. PATENT DOCUMENTS

| | | | | |
|---|---|---|---|---|
| 5,871,789 | A * | 2/1999 | Romagnoli | B65B 29/04 |
| | | | | 53/413 |
| 6,637,175 | B2 * | 10/2003 | Ghirlandi | B65B 29/028 |
| | | | | 53/134.2 |
| 2017/0240306 | A1 * | 8/2017 | Spatafora et al. | B65B 29/04 |

FOREIGN PATENT DOCUMENTS

| | | |
|---|---|---|
| CN | 103402875 A | 11/2013 |
| CN | 108698720 A | 10/2018 |
| DE | 102013007385 A1 | 10/2014 |
| EP | 762973 A1 | 3/1997 |
| EP | 762974 A1 | 3/1997 |
| EP | 765274 A1 | 4/1997 |
| JP | 2003523896 A | 8/2003 |
| JP | 2012030817 A | 2/2012 |
| WO | 0066435 A1 | 11/2000 |
| WO | 0162599 A1 | 8/2001 |
| WO | 2017145044 A1 | 8/2017 |

* cited by examiner

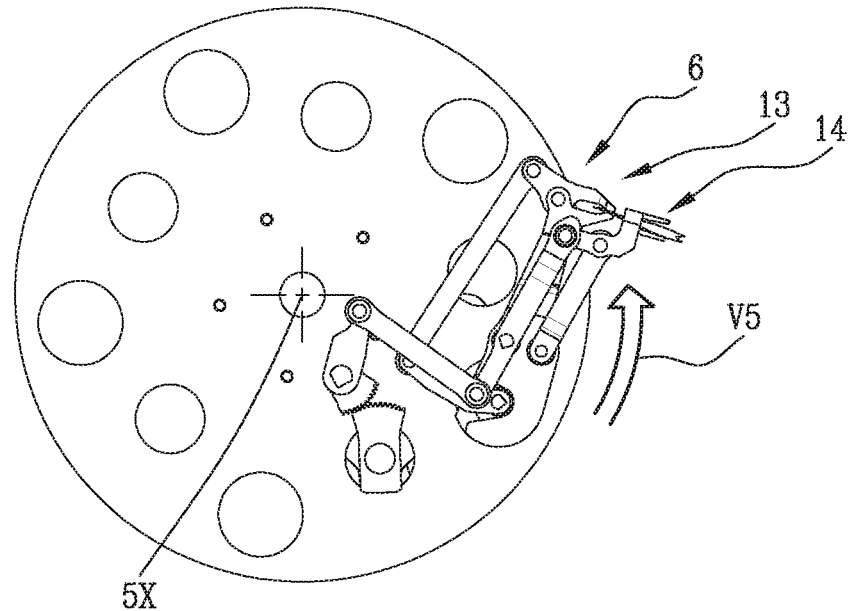
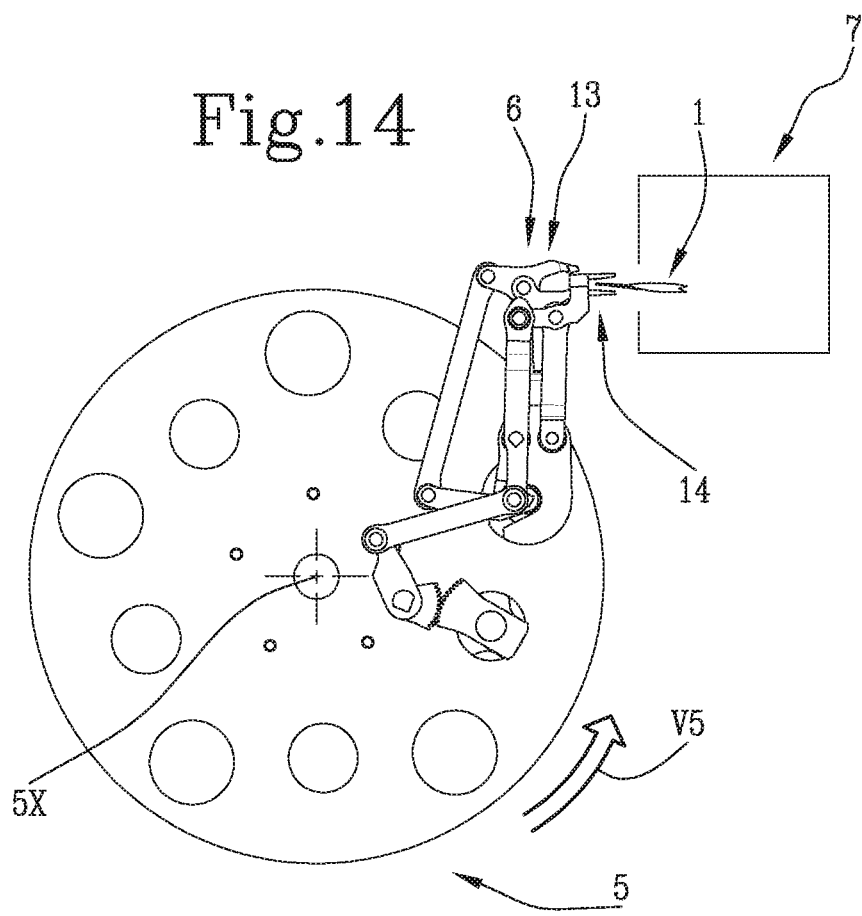

MACHINE FOR FORMING FILTER BAGS FOR INFUSION PRODUCTS

This application is the National Phase of International Application PCT/IB2018/058285 filed Oct. 24, 2018 which designated the U.S.

This application claims priority to Italian Patent Application No. IT102017000123953 filed Oct. 31, 2017, which application is incorporated by reference herein.

TECHNICAL FIELD

This invention relates to a machine for forming filter bags for infusion products, such as tea, coffee, camomile (in powder, granular or leaf form).

BACKGROUND ART

The term filter bags is used to indicate at least two types of filter bag: the single-chamber filter bags, comprising, in a minimum configuration, a piece of filter material forming a chamber containing a dose of infusion product; and the double-chamber filter bags, again comprising a single piece of filter paper, but forming two separate chambers. Each chamber contains a dose of infusion product. The two chambers are folded towards each other forming a single upper end (in the shape of an upturned "V") and a bottom end in the shape of a "W".

The single-chamber and double-chamber filter bags can also be equipped with a tag and a tie string connecting the tag to the filter bag.

Lastly, an overwrap envelope may be added to the above mentioned filter bags for wrapping and closing the single filter bag, in a hermetic or non-hermetic manner.

A first type of machine, used for making filter bags of the type called two-lobed, is known from patent documents EP762973, EP762974 and EP765274 (all in the name of the same Applicant).

The machine extends along a forming and feeding line on which are positioned:

a station for feeding a web of filter paper along a feed surface;

a station for feeding doses of product on the web of filter paper at predetermined distances;

a tabularisation station for folding the strip on itself, wrapping the doses of product and, subsequently, longitudinally joining the strip;

a station for folding individual pieces of filter paper with double chamber;

a carousel, equipped with radially protruding grippers, positioned beneath the folding station and configured to receive individual pieces of folded filter paper; the carousel, moved stepwise about a horizontal axis, rotates each piece of filter paper to the operating stations, arranged one after another and stationary relative to a frame of the machine, to associate to the piece of filter paper a string, suitably wrapped around the piece of filter paper, and a tag in turn connected to the string.

In some machine solutions, depending on the type of filter bag to be formed, there may be (alternatively):

a station for folding the open ends of the two chambers of the piece along the path of the carousel with their retaining by the knotting of the string on the same piece; or a further station for transversal closing of the ends of the piece before or at the same time as the separation from the remaining film.

The machine may also comprise a station for applying a sheet of overwrapping material for each filter bag positioned along the path of the carousel, or at a further carousel.

The machine structured as described above operates intermittently, that is to say, stepwise for all the stations present along the feed line.

The stepwise operation places a limit on the productivity of the machine.

In order to overcome this type of problem, the same Applicant has devised and produced a new type of machine for making filter bags for infusion products (see patent document WO2017/145044) which is movable continuously and thanks to which there is a productivity greater than the productivity of the prior art machines, maintaining a high quality of the filter bag.

This solution basically comprises at least a carousel rotating continuously and having, on its circumferential surface a plurality of first gripping elements for holding a respective piece of filter material being formed and a plurality of stations associated with a corresponding gripping unit and configured to operate on the piece of filter material in order to form, partly or completely, a filter bag along at least one predetermined angular stretch of rotation of the movement carousel. Therefore, the basic concept of the machine is that it comprises a multiplicity of operating units, all operating a same operation on the piece of filter material, all independent of each other and driven continuously about an axis of rotation.

Upon completion of the operations on the piece of filter material, each operating station and the corresponding gripping unit arrive at an outfeed area of the movement carousel and release the piece in such a way that it can be transferred to a subsequent processing step/station, for example a further movement carousel.

As mentioned above, depending on the type of filter bag being formed, a single carousel defining the machine or more than one carousel in succession with each other and having a structure similar to that described above and defining the machine in its entirety, result in the definitive formation of the filter bag. The latter, therefore, must be transferred to a collection or stacking zone or, if it is defective, released into a collection zone, which is different from the previous one, for the defective products.

For this reason, it is necessary to provide an operating unit which is able to operate at the same high speed of the carousel(s) present in the machine for picking up the filter bags from them and, simultaneously, is be able to both discharge any defective filter bags or release the filter bags in a collection or stacking zone.

DISCLOSURE OF THE INVENTION

The aim of the invention is therefore to provide a machine for making filter bags for infusion products with continuous movement which is able to complete in a fast and precise fashion a cycle for forming the filter bag with a safe storage of the filter bag.

More specifically, the aim of the invention to provide a machine for making filter bags for infusion products which is able to select and reject unsuitable filter bags before their storage, maintaining a reduced size and high flexibility at high operating speeds of the machine.

These aims are fully achieved by a machine for forming filter bags for infusion products according to the appended claims.

BRIEF DESCRIPTION OF THE DRAWINGS

The invention will be described with reference to the accompanying drawings, provided by way of example only and without limiting the scope of the invention, in which:

FIGS. 9 to 14 are schematic front views of a gripping device of the transfer wheel in corresponding operating configurations.

DETAILED DESCRIPTION OF PREFERRED EMBODIMENTS OF THE INVENTION

Figure 8:
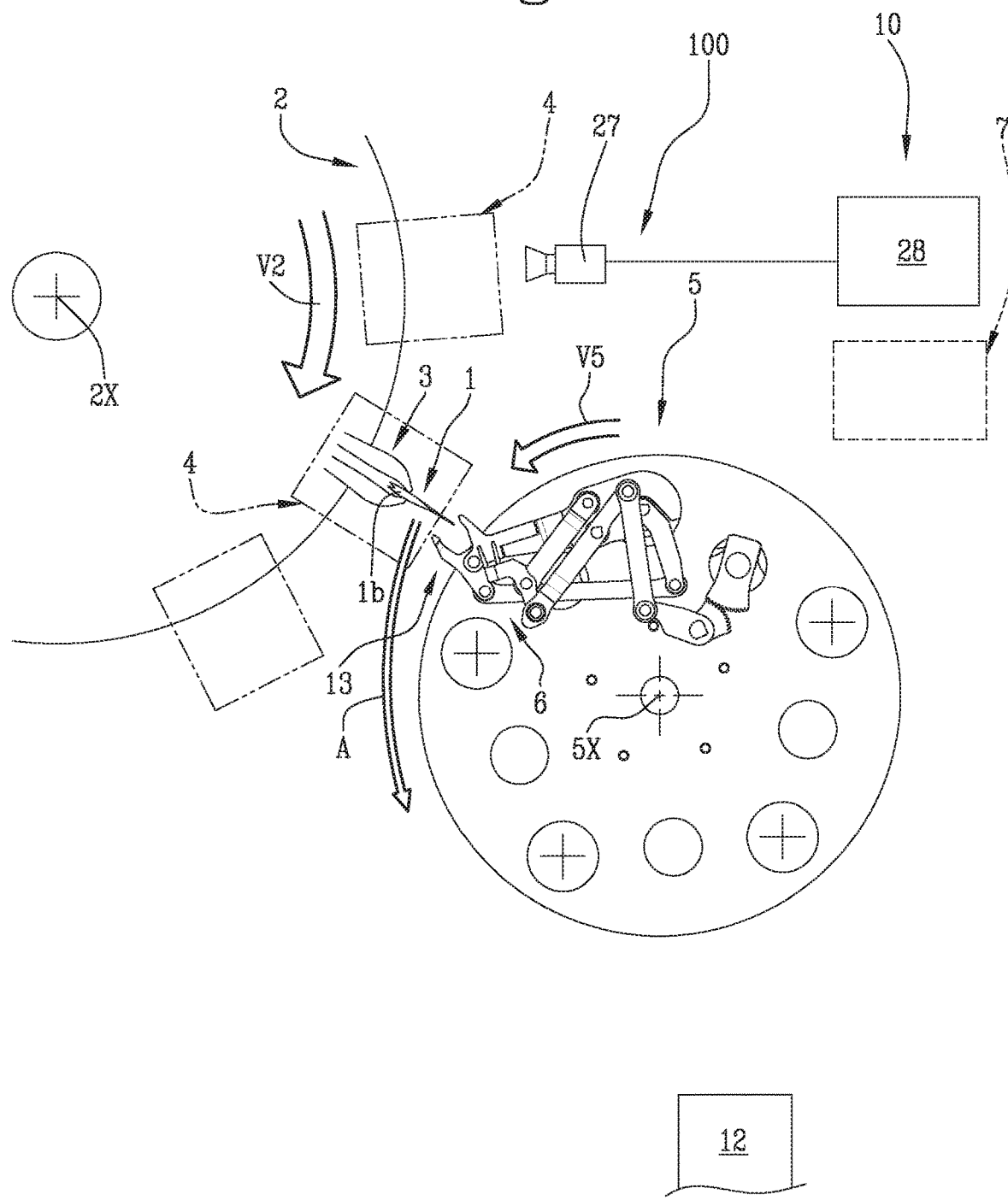
FIG. 8 illustrates a schematic front view of the machine for making filter bags for infusion products according to the invention, and with a gripping device of the transfer wheel in a position for receiving a filter bag.

A machine according to the invention, labelled 100 in its entirety in FIG. 8, is used for making filter bags 1 containing infusion products, such as tea, coffee, camomile dosed in powder, granular or leaf form.

The expression "filter bags" can be used to indicate at least two types of filter bag.

A first type, known as single-chamber, comprises a piece of filter material forming a single chamber containing a dose of infusion product.

A second type of filter bag, known as double-chamber, comprises a single piece of filter material, which forms two separate chambers. Each chamber contains a dose of infusion product. The two chambers are folded towards each other forming a single upper end (in the shape of an upturned "V") and a bottom end in the shape of a "W".

These two types of filter bag may be equipped with a gripping tag and a tie string connecting the tag to the filter bag 1 formed.

An outer overwrapping envelope may also be added to wrap around and enclose each single filter bag 1 formed.

The machine 100, according to the invention, starts from the concept of being able to obtain various types of filter bag, including those mentioned above (from the simpler single-chamber filter bag to the more complex double-chamber bag with tie string and tag in overwrap envelope) adding, when necessary, operating stations designed to perform the requested operation on the piece of filter material or on the filter bag (folding and/or applying tie string and tag, and/or applying outer overwrapping envelope, etc), whilst maintaining a continuous operation of the machine (see also patent document WO2017/145044 by the same Applicant).

The machine 100 for forming filter bags 1 for infusion products starting from pieces 1a of filter material, each having at least one dose of infusion product and advancing along a feed line A, comprises (see FIG. 8) at least a movement carousel 2 rotating continuously about a first axis 2X of rotation.

The machine 100 comprises a plurality of first gripping means 3 positioned along, and continuously movable with, the first movement carousel 2.

Each first gripping means 3 is configured for holding a respective piece of filter material being formed.

The machine 100 also comprises a plurality of operating stations 4 positioned along, and movable continuously with, the first movement carousel 2.

Each operating station 4 is associated with a corresponding first gripping means 3.

Each first operating station 4 is configured to operate on the piece of filter material in order to form or complete a filter bag 1, having a top end 1a and a bottom end 1b, along at least one predetermined angular stretch of rotation of the movement carousel 2.

In short, the basic concept of the machine 100 is that it comprises a multiplicity of operating units, all operating a same operation on the piece of filter material, all independent of each other and driven continuously about an axis of rotation.

This configuration allows an intermediate operation or the completion of the filter bag to be obtained on a large number of pieces of filter material per unit of time and in a reduced space (angular section).

In this specification the carousel 2 is illustrated schematically since the carousel 2 could be the only one present in the machine 100, or it could be the last along the feed line A of the machine 100 of a series of carousels rotating continuously and which are connected to each other to complete the filter bag 1.

As also illustrated in FIGS. 1 to 7, the machine 100 comprises a transfer wheel 5, rotatable continuously about a second axis 5X of rotation parallel to the first axis 2X of rotation, and which is driven in a synchronised fashion with the movement carousel 2.

The transfer wheel 5 is equipped with a plurality of gripping devices 6 positioned along, and able to move continuously with, the transfer wheel 5 and configured for receiving, each, from an operating station 4 of the movement carousel 2 a formed filter bag 1 and releasing the filter bag 1 in an area 7 for collecting the filter bags 1, after a predetermined angular stretch of rotation of the transfer wheel 5.

Again as illustrated, the machine 100 comprises a plurality of control devices 8a, 8b, 9, positioned on the transfer wheel 5, and configured for controlling, in a synchronised fashion during the rotation of the transfer wheel 5, the corresponding plurality of gripping devices 6 between at least a first operating position for receiving the filter bag 1 from the carousel 2 (FIG. 8) or for releasing the filter bag 1 in the collecting area 7 (FIG. 14), and a second operating position for retaining the filter bag 1 on the transfer wheel 5 (FIGS. 9-11 and 13).

The machine 100 also comprises a control unit 10 configured for measuring any defect in the filter bags 1 formed in the carousel 2 (unit 10 illustrated with a block).

The machine 100 also comprises an auxiliary control device 11 located on the transfer wheel 5 and connected to the control unit 10.

Figure 12:
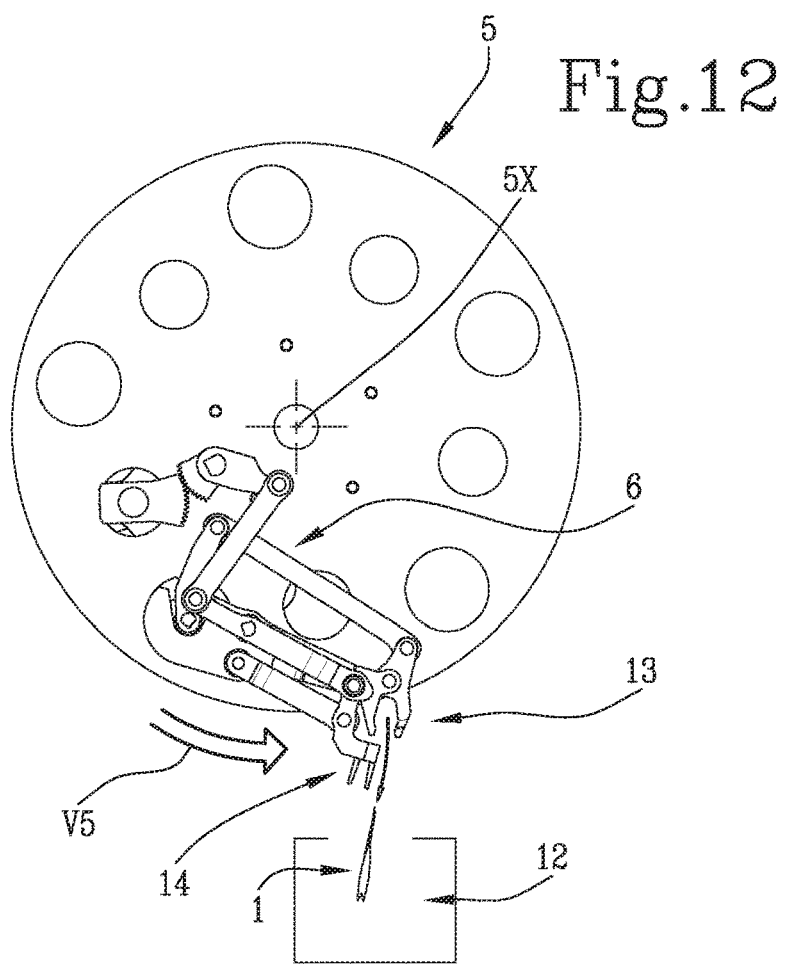

The auxiliary control device 11 is configured for controlling, selectively, the passage from a second operating retaining position to a first release position on a predetermined gripping device 6 and along the angular stretch of rotation of the transfer wheel 5, upon a control signal of the control unit 10 generated in the presence of a defective filter bag 1, in such a way as to release the defective filter bag 1 in a different collecting area 12 (FIG. 12).

In other words, the machine comprises a transfer wheel which is able to move the filter bags, quickly and precisely, to a stacking/storage zone and, simultaneously, carry out, selectively, a rejection of filter bags considered defective without reducing the operating sped of the machine.

Preferably, each gripping device 6 comprises a gripping element 13 configured for retaining, in the second operating position, an end 1a or 1b of the formed filter bag 1 and a stabilising element 14 of the filter bag 1, interacting with the gripping element 13, configured for keeping in a an upright position the filter bag 1, that is, radially positioned relative to the second axis 5X of rotation, during the angular stretch of rotation of the transfer wheel 5.

As illustrated in the drawings, the filter bag 1 is picked up, preferably, by the gripping unit 13 at its top end 1a, whilst the stabilising element 14, as described in more detail below, keeps the rest of the filter bag 1 in an upright configuration, that is, radial relative to the second axis 5X of rotation to prevent stretching or deformation that would negatively affect on the condition of the filter bag rotating at high speed and during the collecting/stacking step.

It should be noted that each gripping unit comprises a gripper 13 consisting of two claws 13a, 13b for retaining the filter bag 1 and articulated on the transfer wheel 5.

In light of this, each gripper 13 is connected to a first control device 8a, 8b configured at least to rotate the two claws 13a, 13b between the first open operating position for receiving the filter bag 1 from the carousel 2 or for releasing the filter bag 1 in the collecting area 7, wherein the two claws 13a, 13b are spaced apart from each other, and a second operating position for retaining the filter bag 1, wherein the two claws 13a, 13b are moved close to each other.

Preferably, each stabilising element 14 comprises a double lever 14a, 14b configured in the form of a fork and articulated to one of the claws (13b) of the gripper 13, in such a way that it is positioned on both sides of the gripper 13.

In light of this, each lever 14a, 14b has an end arm 15 which is angled and positioned parallel at least to the claw 13b of the gripper 13.

Each arm 15 is equipped with a pair of end flaps 16 parallel to each other to form an open channel for stabilising the filter bag 1.

It should be noted that the double lever 14a, 14b is connected to a second control device 9 configured for moving the two levers 14a, 14b between a first non-operating position wherein the corresponding arms 15 and tabs 16 are positioned withdrawn relative to the two claws 13a, 13b of the gripper 13 (FIGS. 8 and 9) at least at their first open operating position for receiving the filter bag 1, and a second operating position, wherein the corresponding arms 15 and flaps 16 are positioned advanced relative to the two claws 13a, 13b of the gripper 13, in such a way as to intercept, with the two pairs of flaps 16, a corresponding intermediate portion of the side edges of the filter bag 1 at least at the second operating position for retaining the filter bag 1 by the gripper 13 (FIGS. 10-14).

Preferably, the first control device is composed of two sub-control devices 8a, 8b for the corresponding claws 13a, 13b of the gripper 13.

One of the two sub-control devices (labelled 8a) is configured for travelling along a main cam track 17, which is located inside the transfer wheel 5, configured for modifying, at least temporarily, a part of its profile, on receiving a signal from the auxiliary control device 11, in such a way as to allow the passage, on a predetermined gripping device 6, from the second operating retaining position (FIG. 4) to a first release position (FIG. 5) at a point along the angular section of rotation of the transfer wheel 5.

Preferably, the auxiliary control device 11 comprises an auxiliary arcuate stretch 18 of cam track positioned alongside the main cam track 17 traveled along by the sub-control device 8a for controlling one of the claws (the 13a).

Figure 1:
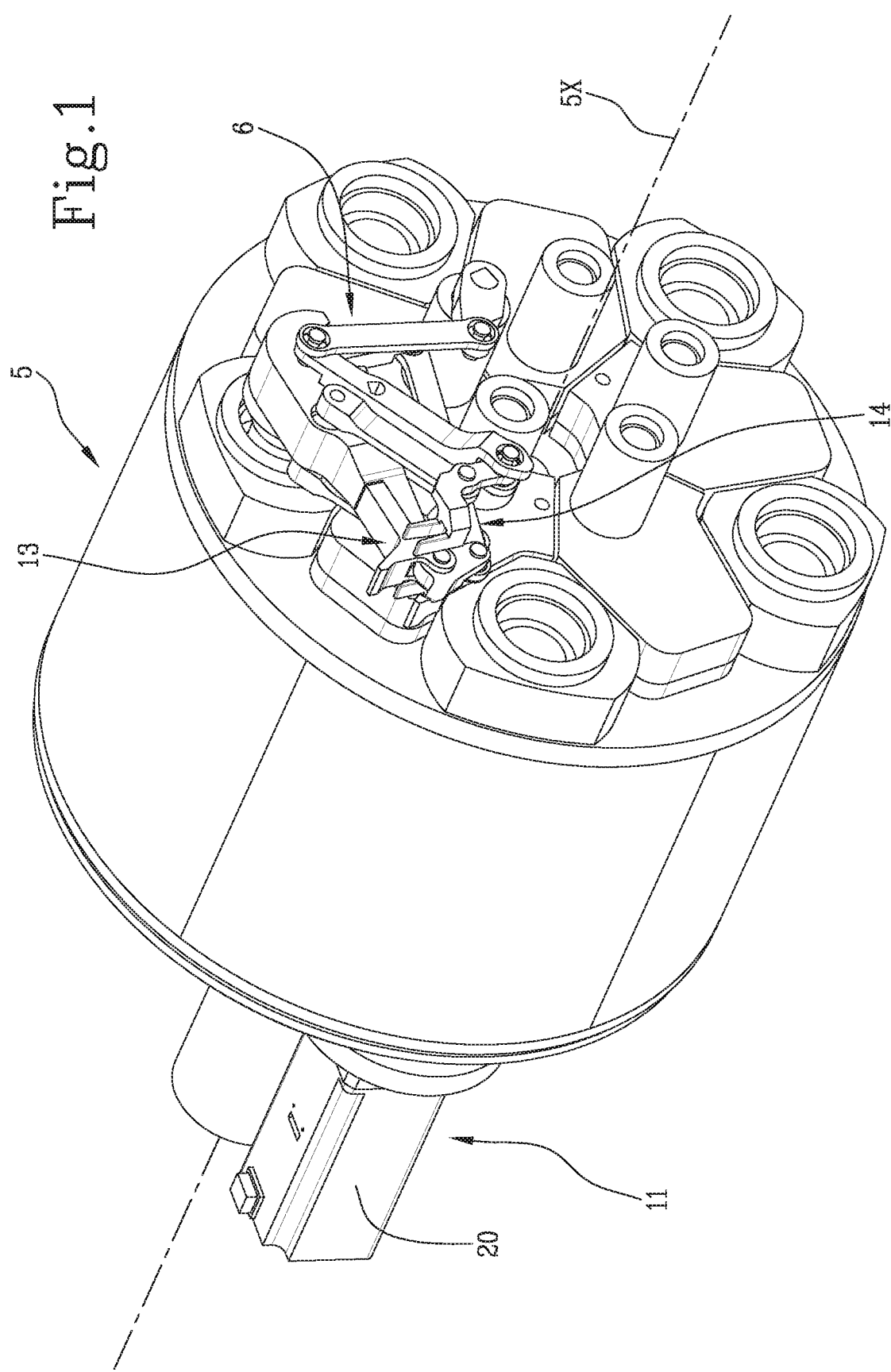
FIG. 1 is a perspective view, with some parts cut away to better illustrate others, of a transfer wheel forming part of the machine for forming filter bags for infusion products according to this invention.
Figure 2:
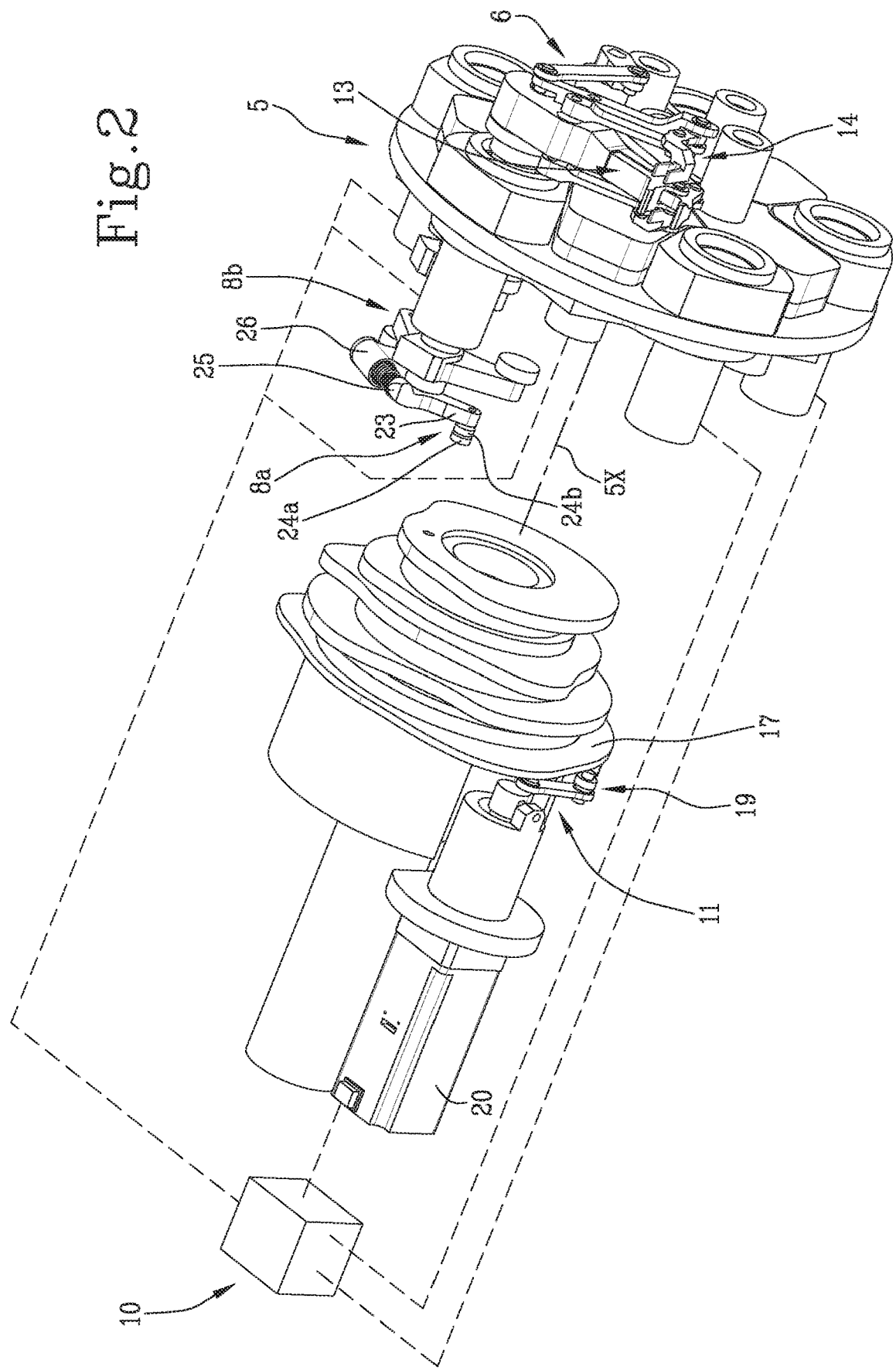
FIG. 2 is an exploded perspective view, with some parts cut away in order to better illustrate others, of the transfer wheel of FIG. 1.
Figure 3:
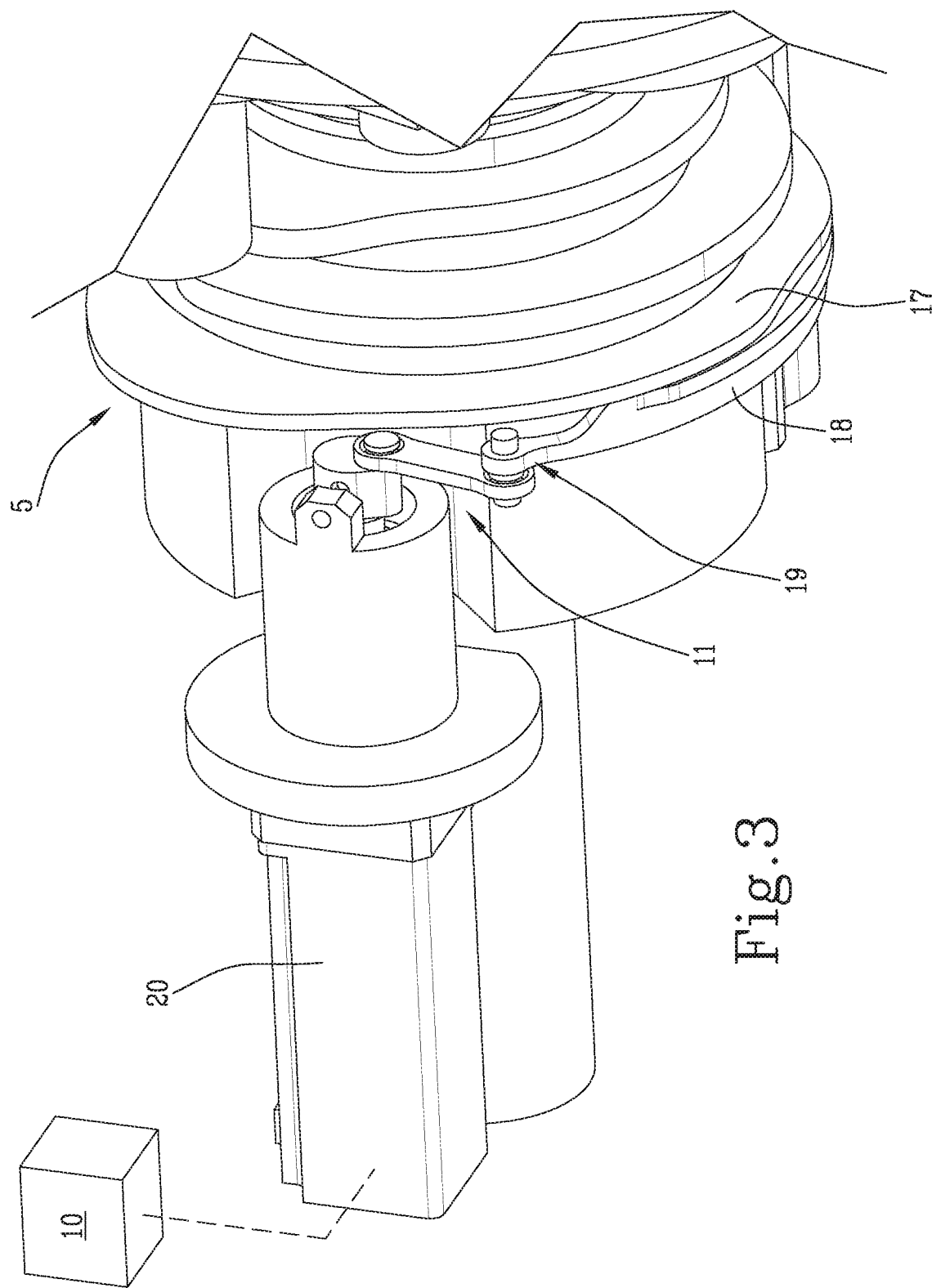
FIG. 3 illustrates a perspective view of an enlarged detail of the transfer wheel according to the preceding figures.
Figure 5:
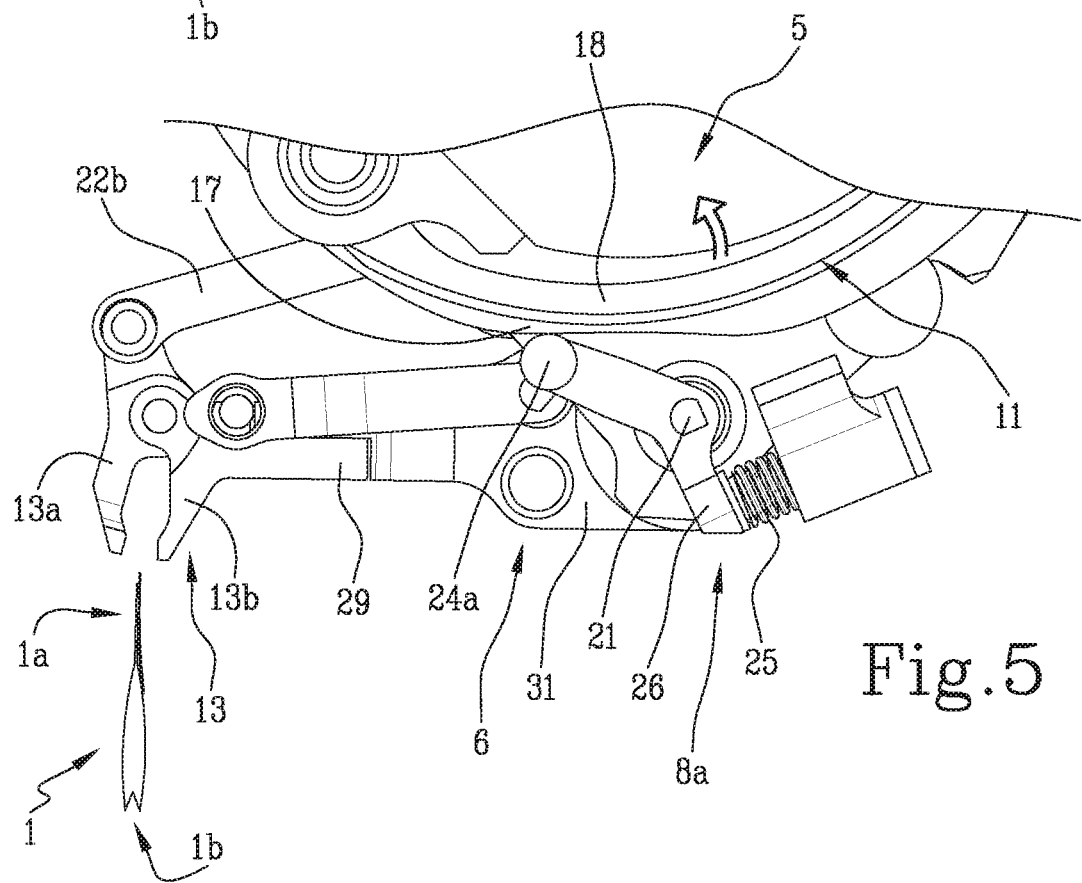
Figure 6:
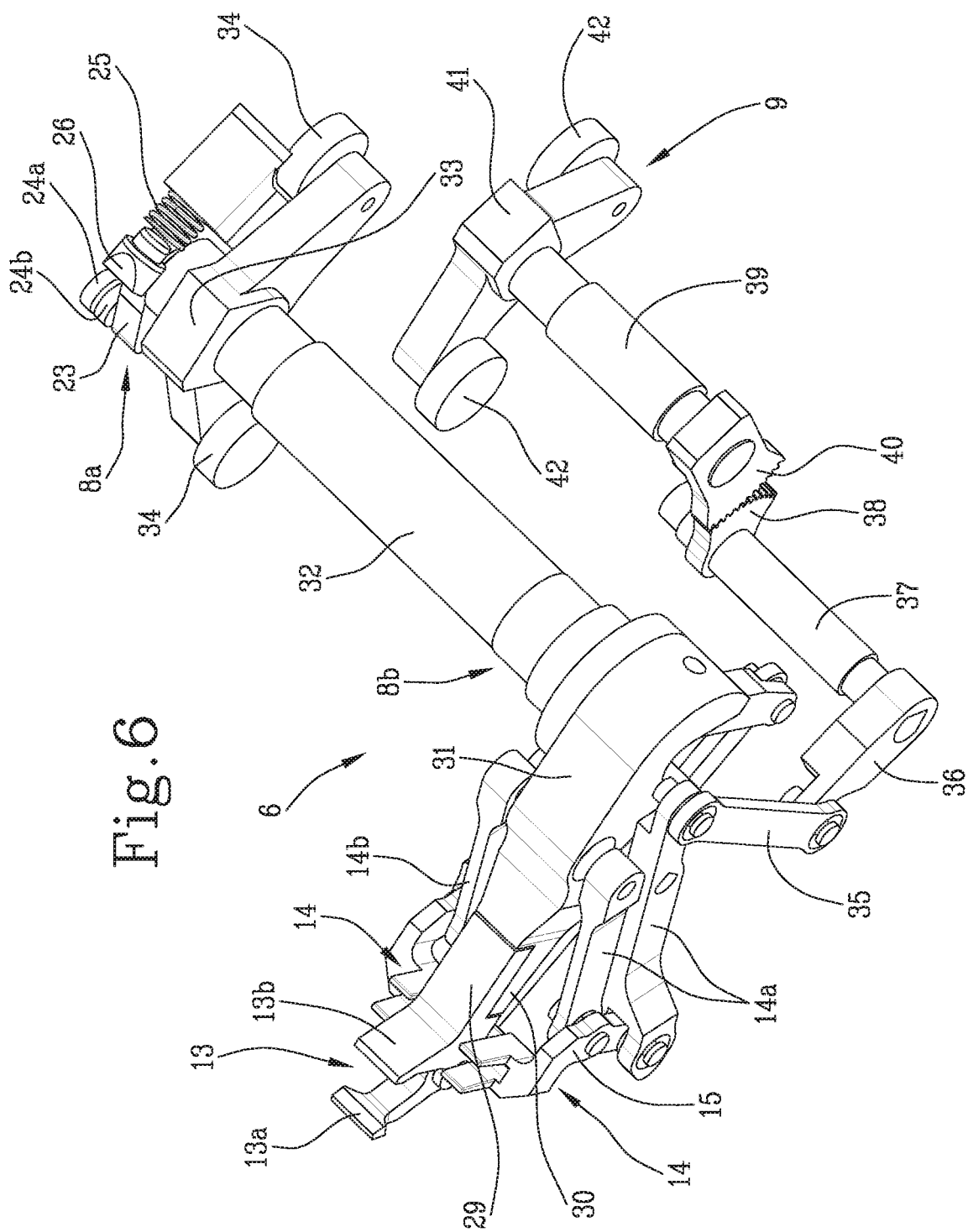
FIG. 6 is a perspective view of a gripping device applied to the transfer wheel and corresponding control devices.
Figure 7:
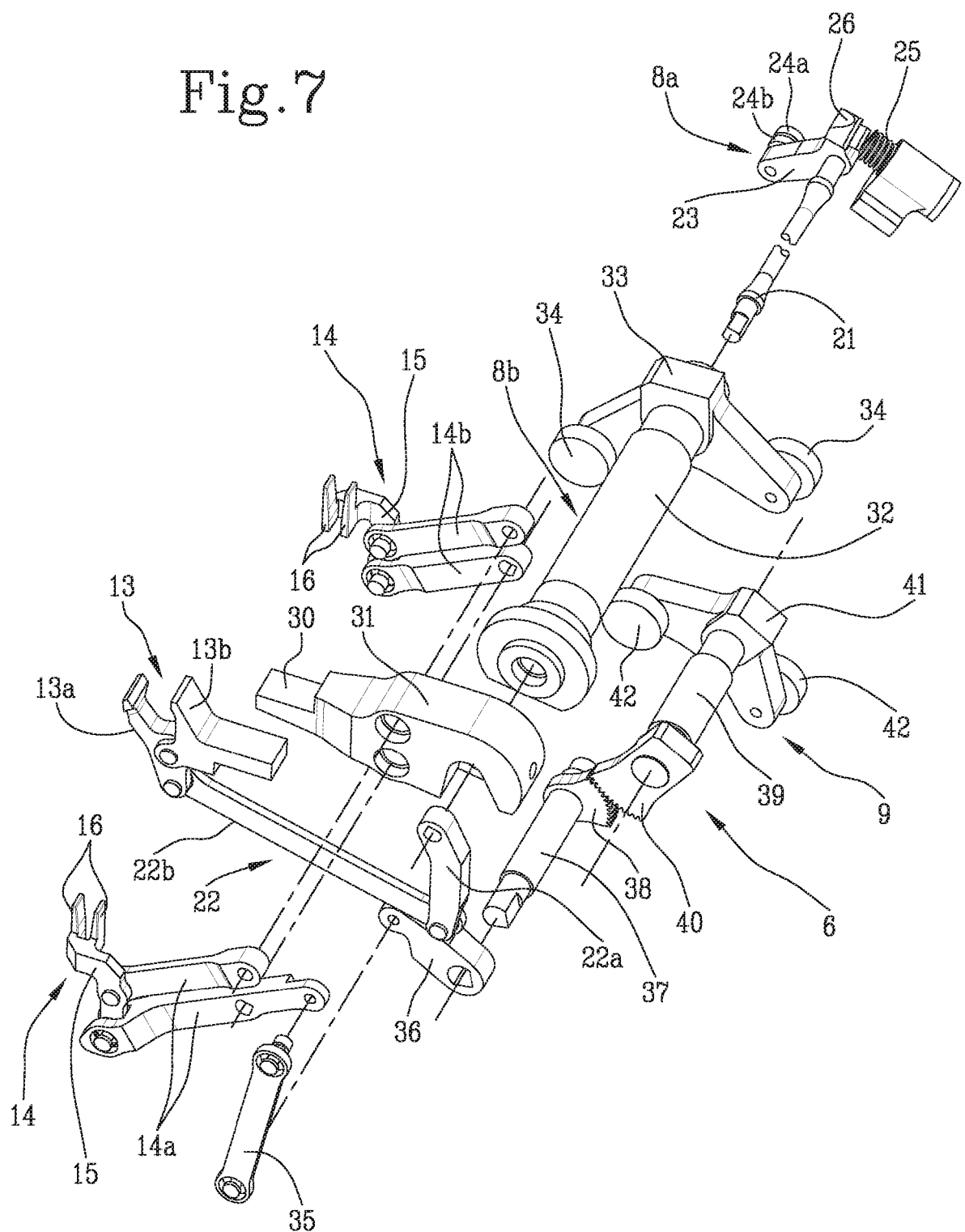
FIG. 7 illustrates a perspective exploded view of the gripping device of FIG. 6.

The main cam track 17 has a variation of its profile, that is, an undulation facing towards the second axis 5X of rotation, in the stretch alongside the auxiliary cam track 18 (see FIGS. 3 and 5).

In light of this, the auxiliary cam track 18 is articulated, at a relative end, to the transfer wheel 5 (that is, to the fixed support unit of the cam tracks), and, at the other end, to a kinematic unit 19 connected to a motor-driven unit 20.

The motor-driven unit 20 is connected to the control unit 10 in such a way as to allow a partial rotation, when requested by the control unit 10, of the auxiliary cam track 18 between a first operating advanced position wherein the auxiliary cam track 18 protrudes relative to the undulated stretch of the main cam track 17 (FIG. 4), in such a way as to keep the gripper 13 in the second operating retaining position, and a second operating retracted position, wherein the auxiliary cam track 18 uncovers the undulated stretch of the main cam track 17 (FIG. 5), so as to allow the sub-control device 8a to command the passage of the gripper 13 from the second operating retaining position to the first operating releasing position.

In light of this, the sub-control device 8a comprises a control rod 21 positioned parallel to the second axis 5X of rotation of the transfer wheel 5 and articulated, by means of a drive unit 22 (external, consisting of a lever 22a and a connecting rod 22b), to a corresponding claw 13a of the gripper 13.

The control rod 21 is articulated, at its end inside the transfer wheel 5, to an end of a connecting rod 23 equipped, in turn, on the other end, with a pair of cam follower rollers 24a, 24b which are positioned alongside each other in such a way as to follow the main cam track 17 and the auxiliary cam track 18 in its first operating advanced position.

An elastic member 25 is interposed between a contact lever 26 of the connecting rod 23 and the control device 8b (in particular a rocker 33 which is described in more detail below) at least to keep constantly in contact one of the cam follower rollers 24a or 24b with the stretch of the main undulated cam track 17 at the second withdrawn operating position of the auxiliary cam track 18.

A brief description is given below (FIGS. 6 and 7) to complete the construction detail of the gripper elements 6 and the respective first and second control devices 8a and 8b and 9.

The two claws 13a and 13b of the gripper 13 are articulated to each other at a single point.

The claw 13a is, as mentioned, connected to its sub-control device 8a by means of the drive linkage 22 and is designed to move relative to the claw 13b in the case for release of a defective filter bag 1.

The claw 13b is provided with a lever extension 29 positioned in contact with the sub-control device 8b.

The second sub-control device 8b comprises an operating body 31 articulated to the transfer wheel 5 and provided, at a relative end, with a pushing nose 30 in stable contact with the lever extension 29 of the claw 13b.

The operating body 31 is in turn connected to a rotatable cylinder 32 extending inside the transfer wheel 5 and with an axis of extension parallel to the second axis 5X of rotation.

The cylinder 32 is equipped, on its innermost end, with a rocker 33 having a pair of cam follower rollers 34 in contact with a respective cam track to allow the movement of the claw 13b.

It should be noted that the cylinder 32 has a central hollow though seat engaged by the control rod 21 of the other in the sub-control device 8a.

In this way, the control devices 8a and 8b are coaxial.

It should also be noted that the special constructional configuration of the two sub-control devices allows the gripper of roto-translate in such a way as to perform a movement towards and away from the second axis 5X of rotation, in particular in position for receiving the filter bag 1 and position for releasing the filter bag 1 in the collecting zone 7.

The second control device 9 of the stabilising element 14 comprises:

a connecting rod 35 articulated, at one end, to one of the two pairs of levers 14a and 14b;

a drive lever 36 articulated, at one end, to the other end of the connecting rod 35;

a first shaft 37 connected at the other end of the drive lever 36 and equipped, at its other end, with a first toothed sector 38 with an arcuate shape; the first shaft 37 has an axis of extension parallel to the second axis 5X of rotation and is positioned, on the transfer wheel 5, alongside the point of articulation of the operating body 30 and the control lever 21 of the first control device 8a, 8b;

a second shaft 39 having, at one end, a second toothed sector 40 meshed at the front with the first toothed sector 38; the second shaft 39 has an axis of extension parallel to the second axis 5X of rotation and extends inside the transfer wheel 5; the second shaft 39 is provided on its inner end with a rocker 41 having a pair of cam follower rollers 42 in contact with a respective cam track to allow the movement, in both directions, of the two pairs of levers 14a and 14b.

It should be noted that the two pairs of levers 14a and 14b, which each represent a sort of four-bar linkage, are articulated, at corresponding free ends, with the operating body 31.

Preferably, the control unit 10 comprises:

at least one sensor 27 (preferably optical, such as, for example, a video camera) configured for generating a measuring signal indicating at least a defect present in a filter bag 1 picked up by a gripping element 6 of the transfer wheel 5, and a processing unit 28 configured for receiving the measuring signal and for sending to the auxiliary control device 11 an activation signal, so as to allow the predetermined gripping unit 6 the passage from a second operating retaining position to a first release position along the angular stretch of rotation of the transfer wheel 5.

In light of this, there may be a plurality of sensors 27 on the transfer wheel 5 corresponding to the number of gripping devices 6.

Preferably, the transfer wheel 5 has a direction V5 of rotation opposite to the direction V2 of rotation of the carousel 2 (in the case illustrated in FIG. 8 by way of example only, the direction of the carousel 2 is clockwise, whilst the direction of the transfer wheel 5 is anti-clockwise).

It should be noted that the transfer wheel 5 has a number of gripping devices 6 different from the number of operating stations 4 of the carousel 2.

Preferably, the number of gripping devices 6 on the wheel 5 is less than the number of operating stations 4 of the carousel 2.

In light of this, the speed of rotation of the transfer wheel 5 is different from the speed of rotation of the carousel 2.

Preferably, the speed of rotation of the transfer wheel 5 is greater than the speed of rotation of the carousel 2.

Figure 4:
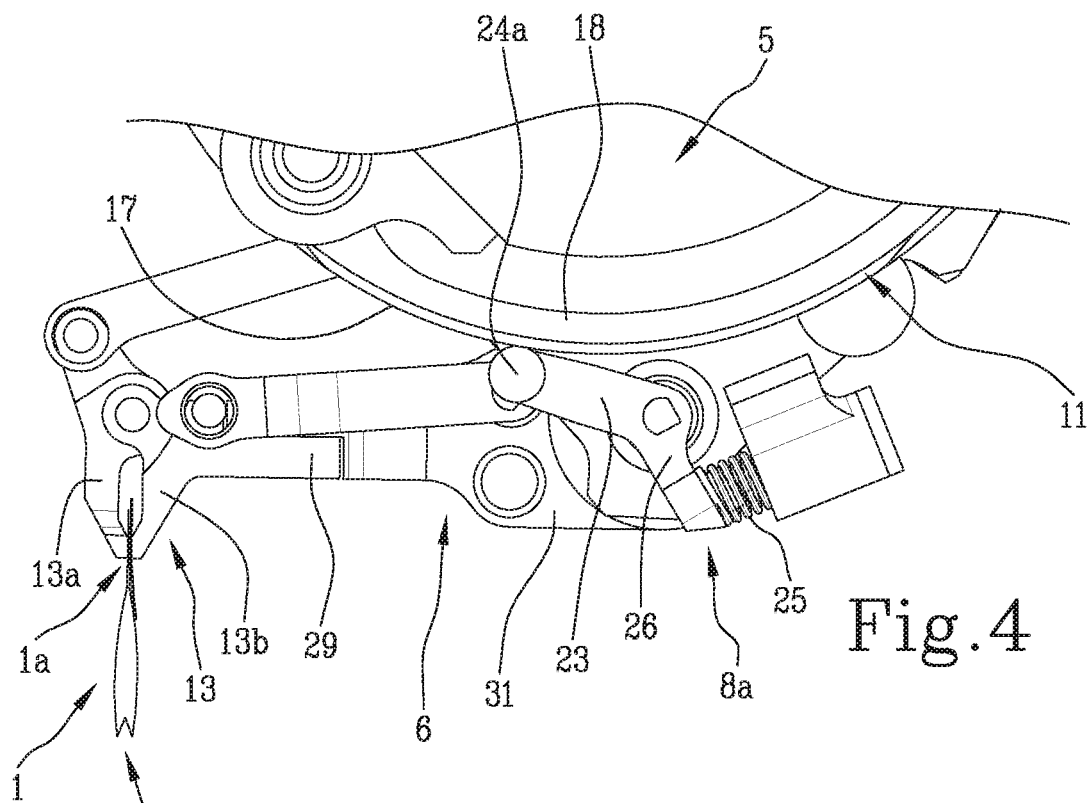
FIGS. 4 and 5 illustrate front and rear views of a lower part of the transfer wheel equipped with an auxiliary control device in two different operating configurations.
Figure 9:
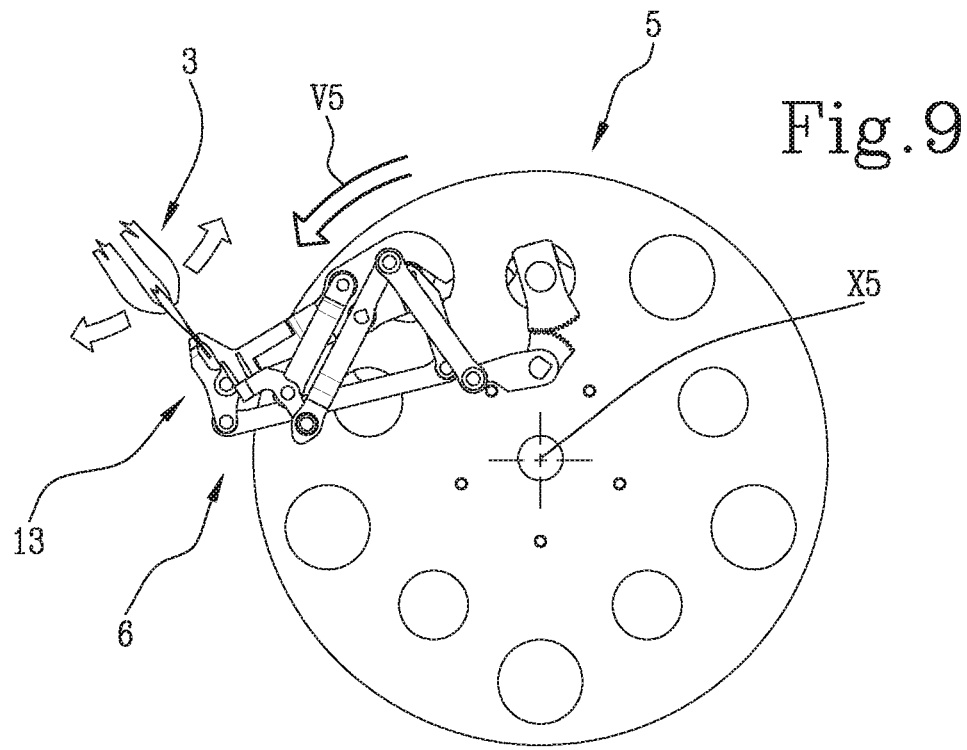
Figure 10:
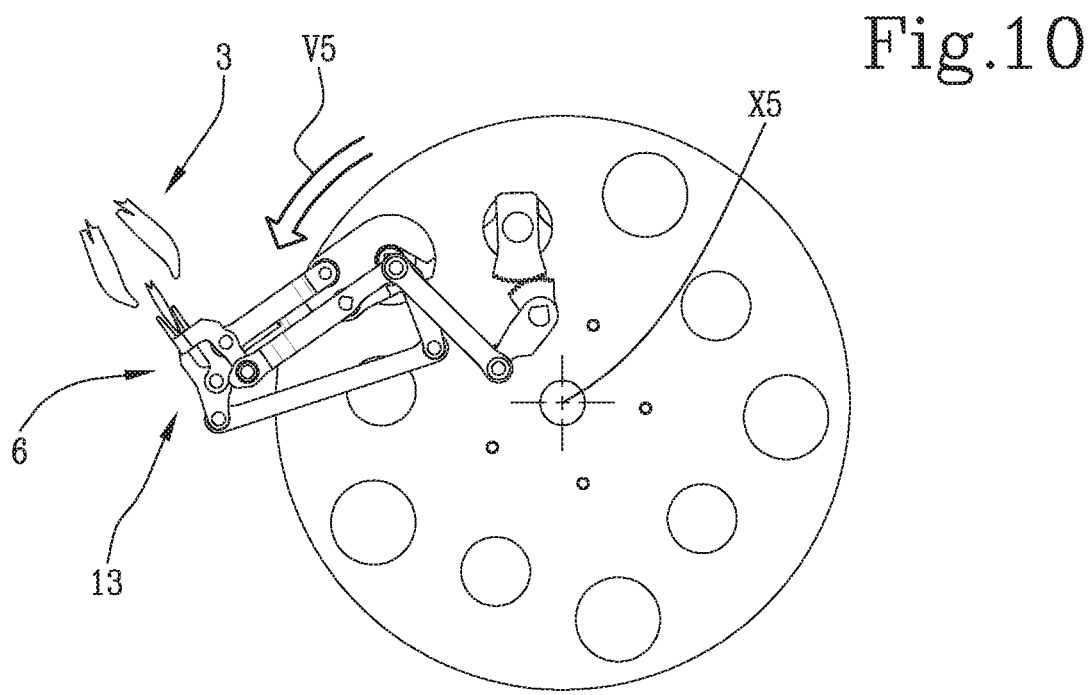
Figure 11:
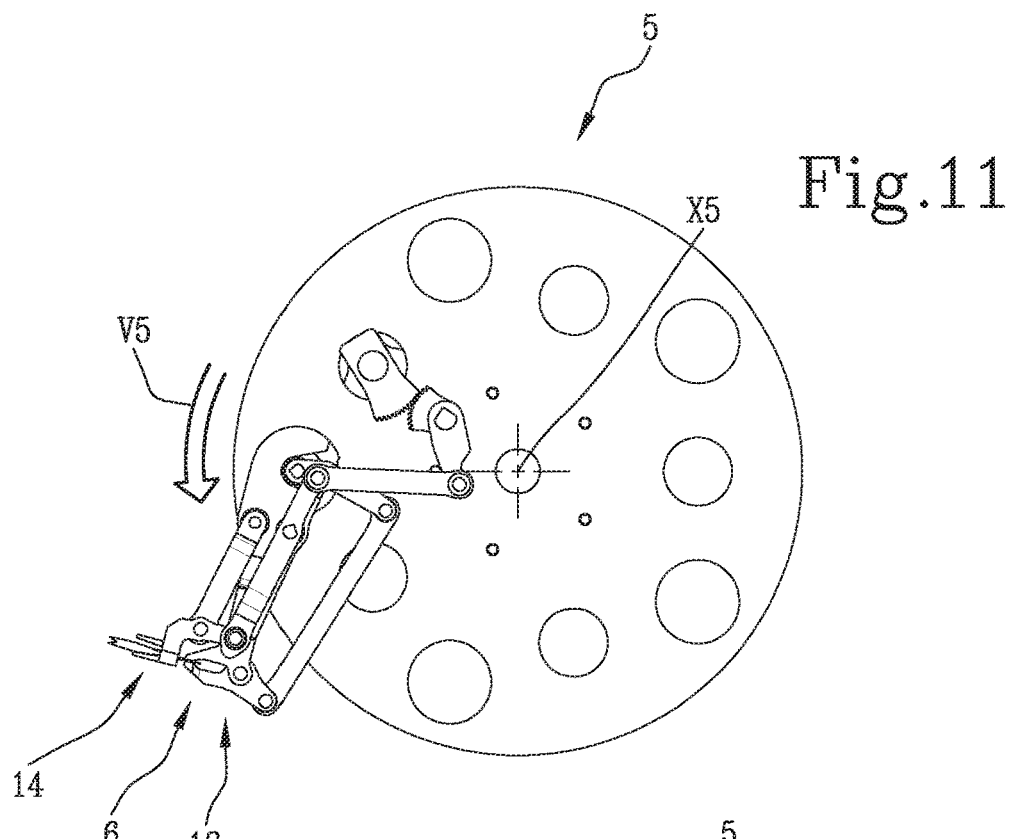

As illustrated in FIGS. 8 to 14, the transfer wheel 5 operates as described below (a single gripping device is described for simplicity of description) and according to a series of positions along the arcuate stretch of operating path of the transfer wheel 5:

the rotation of the transfer wheel 5 moves the gripper 13 tangentially towards the carousel 2 where it crosses an operating station 4; the gripper 13 is in the open position and protruding towards the operating station 4 and the stabilising element 14 is in the withdrawn position (FIG. 8);

the gripper 13 is closed on one end of the filter bag 1 formed and simultaneously the gripping units 3 of the operating station 4 release the filter bag 1; the stabilising element 14 moves to a forward position to keep the rest of the filter bag 1 in a position which is flat and radial relative to the second axis 5X of rotation (FIG. 9);

the gripper 13 withdraws and starts the rotation towards the collection zone 7 lowering relative to the carousel 2 (FIGS. 10 and 11);

if the filter bag 1 has a manufacturing defect, the control unit 10 activates the auxiliary control device 11, in such a way as to modify the cam path of the gripper 13 selected; the gripper 13, upon reaching the lower point of the arcuate stretch of path, opens and lets fall the filter bag 1 in the different collection zone for filter-bags 1 which are defective (FIGS. 4 and 12);

if the filter bag 1 is correctly formed, the gripper 13 continues its path in the closed configuration (FIGS. 5 and 13) until reaching the unloading point in the collection zone 7 (FIG. 14) wherein the gripper 13 protrudes forwards and moves in the open releasing position, before proceeding with another cycle.

The preset aims are fully achieved with the machine structure just described.

In effect, a machine according to the invention is extremely flexible, configurable as a function of the filter bag to be made, and with a high productivity.

It should be noted that each individual operation on the piece of filter material, or on the filter bag, is no longer linked to the pause time (as in the machines with step-mode operation) and has a duration independent from one another. It is therefore possible to lengthen or shorten, as necessary, the time of execution of an operation simply by using a longer or shorter stretch of rotation of the movement carousels.

The transfer wheel structured in this way is extremely precise and has a high operational flexibility irrespective of the number of carousels present in the machine or of the position in which it is applied in the machine.

The presence of the control unit and of the auxiliary control device defines a precise and rapid system for the selection and elimination of the defective filter bags even at high operating speeds.

The invention claimed is:

1. A machine for making filter bags for infusion products starting from pieces of filter material, each of the filter bags containing at least one dose of infusion product and advancing along a feed line, comprising:

a movement carousel for continuous rotary movement about a first axis of rotation;

a plurality of first grippers positioned along, and continuously movable with, the movement carousel, each of the first grippers being configured for holding a respective piece of filter material being formed;

a plurality of operating stations positioned along, and continuously movable with, the movement carousel, each of the operating stations being positioned with a corresponding one of the first grippers and being configured to operate on one of the pieces of filter material in order to form a filter bag, having two ends, along at least a predetermined angular stretch of rotation of the movement carousel, a transfer wheel, rotatable continuously about a second axis of rotation parallel to the first axis of rotation, and which is driven in a synchronized fashion with the movement carousel; the transfer wheel including a plurality of second grippers positioned along, and able to move continuously with, the transfer wheel and configured for receiving, each, from a corresponding operating station of the movement carousel a formed filter bag and releasing the filter bag in a collecting area for collecting the filter bags, after a predetermined angular stretch of rotation of the transfer wheel;

a plurality of control devices, positioned on the transfer wheel, and configured for controlling, in a synchronized fashion during the rotation of the transfer wheel, the corresponding second grippers between at least an open first operating position for receiving the filter bag from a corresponding one of the operating stations or for releasing the filter bag in the collecting area, and a retaining second operating position for retaining the filter bag on the transfer wheel;

a control unit configured for measuring any defect in the filter bags formed in the operating stations;

an auxiliary control device located on the transfer wheel and connected to the control unit; the auxiliary control device being configured for controlling, selectively, a passage from the retaining second operating position to the open first operating position on a predetermined one of the second grippers and along the angular stretch of rotation of the transfer wheel, upon a control signal of the control unit generated in a presence of a defective filter bag in such a way as to release the defective filter bag in a different collecting area;

wherein each of the second grippers is configured for retaining, in the retaining second operating position, an end of the formed filter bag and a stabilizing element of the filter bag, interacting with the second gripper, configured for keeping the filter bag in an upright position radially positioned relative to the second axis of rotation, during the angular stretch of rotation of the transfer wheel;

wherein each of the second grippers includes two claws configured for retaining the filter bag and articulated on the transfer wheel;

wherein each stabilizing element comprises a double lever configured as an articulated fork on one of the claws of the second gripper to be positioned on both sides of the second gripper; each lever of the double lever having an end arm angled and positioned parallel to one of the two claws of the second gripper; each end arm including a pair of end flaps parallel to each other to form an open stabilizing channel; the double lever being connected to a second control device of the plurality of control devices configured for moving the two double lever between a non-operating double lever first position wherein the corresponding arms and end flaps are positioned withdrawn relative to the two claws of the second gripper at least at the open first operating position for receiving the filter bag, and an operating double lever second position, wherein the corresponding arms and end flaps are positioned advanced relative to the two claws of the second gripper, to intercept, with the two pairs of end flaps, a corresponding intermediate portion of the side edges of the filter bag at least at the retaining second operating position for retaining the filter bag by the second gripper.

2. The machine according to claim 1, wherein each of the second grippers is connected to a first control device of the plurality of control devices configured to rotate the two claws between the open first operating position for receiving the filter bag from the movement carousel or for releasing the filter bag in the collecting area, where the two claws are spaced apart from each other, and the retaining second operating position for retaining the filter bag, where the two claws are moved close to each other.

3. The machine according to claim 2, wherein the first control device includes two sub-control devices respectively for the two claws of the second gripper; one of the two sub-control devices being configured for travelling along a main cam track, which is located inside the transfer wheel, the main cam track configured for modifying, at least temporarily, an active part of the main cam track profile, on receiving a signal from the auxiliary control device, in such a way as to allow the passage, of a predetermined second gripper, from the retaining second operating position to the opener first operating position at a point along the angular section of rotation of the transfer wheel.

4. The machine according to claim 3, wherein the auxiliary control device comprises an arc-shaped stretch of auxiliary cam track positioned next to the main cam track travelled along by the sub-control device of one of the two claws configured for travelling along the main cam track; the main cam track including an undulation, of the main cam track profile in the stretch of path alongside the auxiliary cam track; the auxiliary cam track being articulated, at one relative end, to the transfer wheel, and, at another relative end, to a kinematic unit connected to a motor-driven unit; the motor-driven unit being connected to the control unit in such a way as to allow a partial rotation, when requested by the control unit, of the auxiliary cam track between an advanced position wherein the auxiliary cam track protrudes relative to the undulated stretch of the main cam track, in such a way as to keep the second gripper in the retaining second operating position, and a retracted position, wherein the auxiliary cam track uncovers the undulation, so as to allow the sub-control device to command the passage of the second gripper from the retaining second operating position to the open first operating position.

5. The machine according to claim 4, wherein the sub-control device configured for travelling along the main cam track comprises a control rod positioned parallel to the second axis of rotation of the transfer wheel and articulated, by a drive unit to a corresponding claw of the second gripper; the control rod being articulated, at an end inside the transfer wheel, to an end of a connecting rod including, in turn, on an other end, with a pair of cam follower rollers, which are positioned alongside each other in such a way as to follow the main cam track and the auxiliary cam track in the advanced position; an elastic member being interposed between a contrast lever having the connecting rod and the transfer wheel to keep one of the cam follower rollers constantly in contact with the stretch of undulated main cam track at the retracted position of the auxiliary cam track.

6. The machine according to claim 1, wherein the control unit comprises at least one sensor configured for generating a measuring signal indicating a defect present in the filter bag picked up by the second gripper of the transfer wheel, and a processing unit configured for receiving the measuring signal and for sending to the auxiliary control device an activation signal, to allow the predetermined second gripper to move from the retaining second operating position to the open first operating position along the angular stretch of rotation of the transfer wheel.

7. The machine according to claim 1, wherein the transfer wheel has a direction of rotation opposite to a direction of rotation of the movement carousel.

8. The machine according to claim 1, wherein the transfer wheel has a number of second grippers different from a number of operating stations of the movement carousel.

9. A machine for making filter bags for infusion products starting from pieces of filter material, each of the filter bags containing at least one dose of infusion product and advancing along a feed line, comprising:
- a movement carousel for continuous rotary movement about a first axis of rotation;
- a plurality of first grippers positioned along, and continuously movable with, the movement carousel, each of the first grippers being configured for holding a respective piece of filter material being formed;
- a plurality of operating stations positioned along, and continuously movable with, the movement carousel, each of the operating stations being positioned with a corresponding one of the first grippers and being configured to operate on one of the pieces of filter material in order to form a filter bag, having two ends, along at least a predetermined angular stretch of rotation of the movement carousel,
- a transfer wheel, rotatable continuously about a second axis of rotation parallel to the first axis of rotation, and which is driven in a synchronized fashion with the movement carousel; the transfer wheel including a plurality of second grippers positioned along, and able to move continuously with, the transfer wheel and configured for receiving, each, from a corresponding operating station of the movement carousel a formed filter bag and releasing the filter bag in a collecting area for collecting the filter bags, after a predetermined angular stretch of rotation of the transfer wheel;
- a plurality of control devices, positioned on the transfer wheel, and configured for controlling, in a synchronized fashion during the rotation of the transfer wheel, the corresponding second grippers between at least an open first operating position for receiving the filter bag from a corresponding one of the operating stations or for releasing the filter bag in the collecting area, and a retaining second operating position for retaining the filter bag on the transfer wheel;
- a control unit configured for measuring any defect in the filter bags formed in the operating stations;
- an auxiliary control device located on the transfer wheel and connected to the control unit; the auxiliary control device being configured for controlling, selectively, a passage from the retaining second operating position to the open first operating position on a predetermined one of the second grippers and along the angular stretch of rotation of the transfer wheel, upon a control signal of the control unit generated in a presence of a defective filter bag in such a way as to release the defective filter bag in a different collecting area;
- wherein each of the second grippers is configured for retaining, in the retaining second operating position, an end of the formed filter bag and a stabilizing element of the filter bag, interacting with the second gripper, configured for keeping the filter bag in an upright position radially positioned relative to the second axis of rotation, during the angular stretch of rotation of the transfer wheel;
- wherein each of the second grippers includes two claws configured for retaining the filter bag and articulated on the transfer wheel; each of the second grippers being connected to a first control device of the plurality of control devices configured to rotate the two claws between the open first operating position for receiving the filter bag from the corresponding one of the operating stations or for releasing the filter bag in the collecting area, where the two claws are spaced apart from each other, and the retaining second operating position for retaining the filter bag, where the two claws are moved close to each other;
- wherein the first control device includes two sub-control devices respectively for the two claws of the second gripper; one of the two sub-control devices being configured for travelling along a main cam track, which is located inside the transfer wheel, the main cam track configured for modifying, at least temporarily, an active part of the main cam track profile, on receiving a signal from the auxiliary control device, in such a way as to allow the passage, of a predetermined second gripper, from the retaining second operating position to the open first operating position at a point along the angular section of rotation of the transfer wheel.

10. The machine according to claim 9, wherein the auxiliary control device comprises an arc-shaped stretch of auxiliary cam track positioned next to the main cam track travelled along by the sub-control device of one of the two claws configured for travelling along the main cam track; the main cam track including an undulation, of the main cam track profile in the stretch of path alongside the auxiliary cam track; the auxiliary cam track being articulated, at one relative end, to the transfer wheel, and, at another relative end, to a kinematic unit connected to a motor-driven unit; the motor-driven unit being connected to the control unit in such a way as to allow a partial rotation, when requested by the control unit, of the auxiliary cam track between an advanced position wherein the auxiliary cam track protrudes relative to the undulated stretch of the main cam track, in such a way as to keep the second gripper in the retaining second operating position, and a retracted position, wherein the auxiliary cam track uncovers the undulation, so as to allow the sub-control device to command the passage of the second gripper from the retaining second operating position to the open first operating position.

11. The machine according to claim 10, wherein the sub-control device configured for travelling along the main cam track comprises a control rod positioned parallel to the second axis of rotation of the transfer wheel and articulated, by a drive unit to a corresponding claw of the second gripper; the control rod being articulated, at an end inside the transfer wheel, to an end of a connecting rod including, in turn, on an other end, with a pair of cam follower rollers, which are positioned alongside each other in such a way as to follow the main cam track and the auxiliary cam track in the advanced position; an elastic member being interposed between a contrast lever having the connecting rod and the transfer wheel to keep one of the cam follower rollers constantly in contact with the stretch of undulated main cam track at the retracted position of the auxiliary cam track.

12. The machine according to claim 9, wherein the control unit comprises at least one sensor configured for generating a measuring signal indicating a defect present in the filter bag picked up by the second gripper of the transfer wheel, and a processing unit configured for receiving the measuring signal and for sending to the auxiliary control device an activation signal, to allow the predetermined second gripper to move from the retaining second operating position to the open first operating position along the angular stretch of rotation of the transfer wheel.

13. The machine according to claim 9, wherein the transfer wheel has a direction of rotation opposite to a direction of rotation of the movement carousel.

14. The machine according to claim 9, wherein the transfer wheel has a number of second grippers different from a number of operating stations of the movement carousel.

* * * * *